(12) United States Patent
Lin

(10) Patent No.: US 11,867,970 B2
(45) Date of Patent: Jan. 9, 2024

(54) OPTICAL ELEMENT DRIVING MECHANISM

(71) Applicant: TDK TAIWAN CORP., Taoyuan (TW)

(72) Inventor: Yi-Chieh Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 321 days.

(21) Appl. No.: 16/843,361

(22) Filed: Apr. 8, 2020

(65) Prior Publication Data

US 2020/0363608 A1 Nov. 19, 2020

Related U.S. Application Data

(60) Provisional application No. 62/849,317, filed on May 17, 2019.

(30) Foreign Application Priority Data

Feb. 3, 2020 (CN) .......................... 202020150618.7

(51) Int. Cl.
| | |
|---|---|
| *G02B 7/09* | (2021.01) |
| *G02B 27/64* | (2006.01) |
| *G03B 13/36* | (2021.01) |
| *G03B 5/00* | (2021.01) |
| *H04N 5/225* | (2006.01) |

(Continued)

(52) U.S. Cl.
CPC ............. *G02B 7/09* (2013.01); *G02B 27/646* (2013.01); *G03B 5/00* (2013.01); *G03B 9/40* (2013.01); *G03B 13/36* (2013.01); *H02K 11/02* (2013.01); *H02K 37/04* (2013.01); *H02K 41/0354* (2013.01); *H04N 23/55* (2023.01); *G03B 2205/0007* (2013.01); *G03B 2205/0069* (2013.01)

(58) Field of Classification Search
CPC . G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; G03B 2205/0007; G03B 2205/0053; G03B 2205/0069; G03B 3/02; G03B 3/10; G03B 5/00; G03B 5/04; G03B 13/36; G03B 30/00; H02K 11/21; H02K 11/33; H02K 41/0354; H02K 41/0356
USPC ....... 359/911, 554, 555, 557, 811, 813, 814, 359/824, 872, 877; 396/52, 55
See application file for complete search history.

(56) References Cited

U.S. PATENT DOCUMENTS

| | | | |
|---|---|---|---|
| 2012/0154614 A1* | 6/2012 | Moriya | ................ G02B 27/646 348/208.5 |
| 2013/0076924 A1* | 3/2013 | Wade | ...................... G03B 5/02 348/208.11 |

(Continued)

*Primary Examiner* — Marin Pichler
(74) *Attorney, Agent, or Firm* — Muncy, Geissler, Olds & Lowe, P.C.

(57) ABSTRACT

An optical element driving mechanism is provided. The optical element driving mechanism includes a movable portion, a fixed portion, and a driving assembly. The movable portion is used for connecting to an optical element, wherein the optical element has a main axis. The movable portion is movably connected to the fixed portion. The driving assembly is disposed on the movable portion or the fixed portion for driving the movable portion moving relative to the fixed portion.

18 Claims, 12 Drawing Sheets

(51) Int. Cl.
H02K 11/21 (2016.01)
H02K 41/035 (2006.01)
H02K 11/02 (2016.01)
G03B 9/40 (2021.01)
H02K 37/04 (2006.01)
H04N 23/55 (2023.01)

(56) References Cited

U.S. PATENT DOCUMENTS

2014/0355120 A1* 12/2014 Yeo ........................ G02B 7/04
359/557
2016/0320584 A1* 11/2016 Lee ..................... G02B 27/646

\* cited by examiner

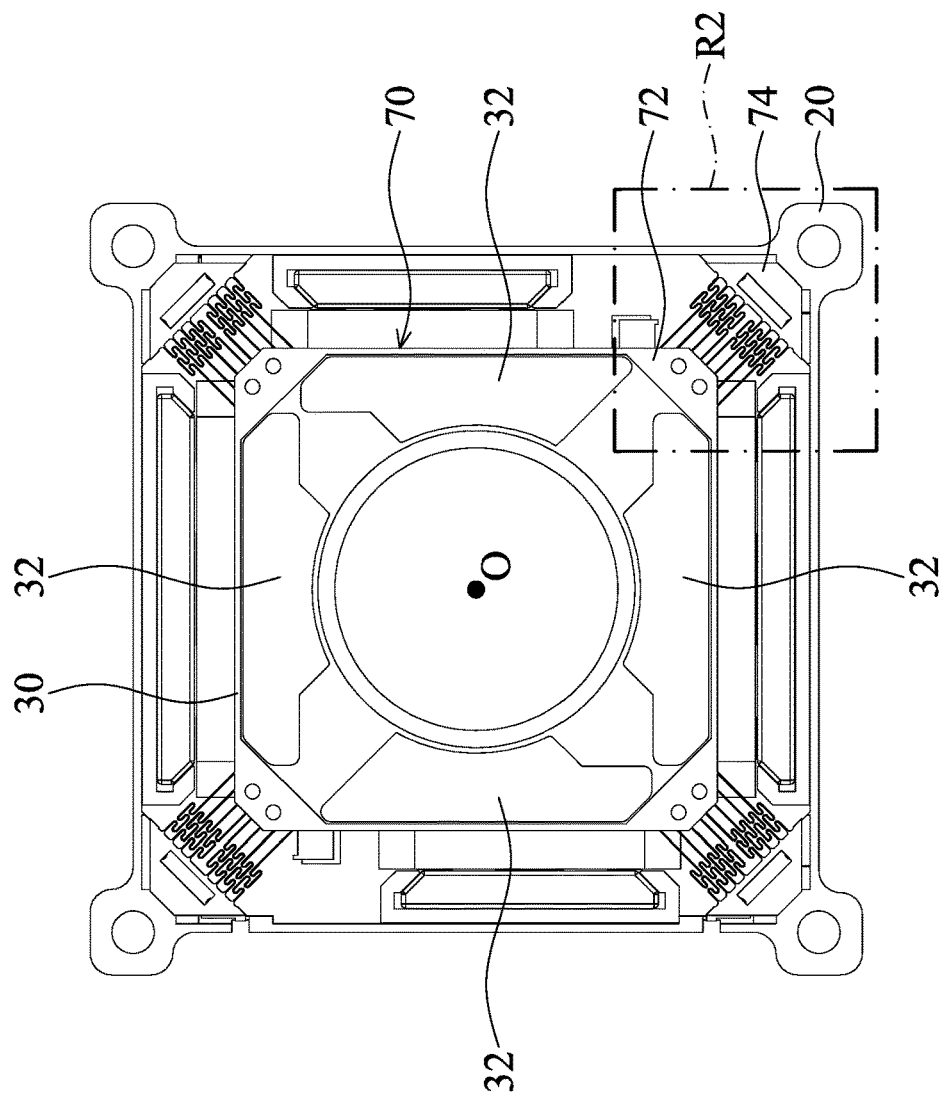
FIG. 5
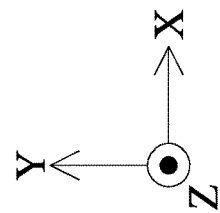

OPTICAL ELEMENT DRIVING MECHANISM

CROSS REFERENCE TO RELATED APPLICATIONS

This application claims the benefit of U.S. Provisional Application No. 62/849,317, filed on May 17, 2019 and China Patent Application No. 202020150618.7, filed on Feb. 3, 2020 the entirety of which are incorporated by reference herein.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided. The optical element driving mechanism includes a movable portion, a fixed portion, and a driving assembly. The movable portion is used for connecting to an optical element, wherein the optical element has a main axis. The movable portion is movably connected to the fixed portion. The driving assembly is disposed on the movable portion or the fixed portion for driving the movable portion moving relative to the fixed portion.

In some embodiments, the driving assembly includes a first magnetic element, a second magnetic element, and a third magnetic element, and the third magnetic element is disposed between the first magnetic element and the second magnetic element. In some embodiments, the driving assembly further includes a fourth magnetic element, a fifth magnetic element, and a sixth magnetic element, the sixth magnetic element is disposed between the fourth magnetic element and the fifth magnetic element, the length of the first magnetic element is different than the length of the fourth magnetic element, and the length of the second magnetic element is different than the length of the fifth magnetic element.

In some embodiments, the first magnetic element and the second magnetic element has tropical shape. In some embodiments, the first magnetic element includes a long side and a short side, the second magnetic element includes a long side and a short side, and the distance between the short side of the first magnetic element and the short side of the second magnetic element is less than the distance between the short side of the first magnetic element and the long side of the second magnetic element in a direction that is perpendicular to the main axis. In some embodiments, the fixed portion includes a base, the base includes a first accommodating element and a second accommodating element, the first magnetic element is disposed in the first accommodating element, and the second magnetic element is disposed in the second accommodating element. In some embodiments, the height of the first accommodating element is different than the height of the second accommodating element along the main axis.

In some embodiments, the height of the first magnetic element is different than the height of the second magnetic element along the main axis. In some embodiments, the length of the first magnetic element is different than the length of the second magnetic element in a first direction that is perpendicular to the main axis. In some embodiments, the width of the first magnetic element is different than the width of the second magnetic element in a second direction that is perpendicular to the main axis, and the first is perpendicular to the second direction.

In some embodiments, the driving assembly includes two first magnetic elements, two second magnetic elements, and two third magnetic elements, the first magnetic elements are symmetrical to the main axis, the second magnetic elements are symmetrical to the main axis, and the third magnetic elements are symmetrical to the main axis. In some embodiments, the optical element driving mechanism further includes two resilient elements connected to the movable portion and the fixed portion. In some embodiments, the resilient elements are symmetrical to the main axis.

In some embodiments, the optical element driving mechanism further includes a circuit electrically connected to the driving assembly, wherein the movable portion has two recesses, and the circuit is positioned in the recesses. In some embodiments, the movable portion includes a holder, and a protruding portion is formed on the holder and extending in the main axis.

In some embodiments, the optical element driving mechanism further includes a position sensor assembly disposed on the fixed portion or the movable portion. In some embodiments, the position sensing assembly includes a first position sensing element disposed on the movable portion and a second position sensing element disposed on the fixed portion, and the first position sensing element is embedded in the movable portion. In some embodiments, the optical element driving mechanism further includes a connecting element, wherein the position sensing assembly includes a first position sensing element disposed on the connecting element and a second position sensing element disposed on the movable portion. In some embodiments, the optical element driving mechanism further includes a connecting circuit, wherein the connecting element includes a concave portion, and the connecting circuit is electrically connected to the position sensing assembly through the concave portion. In some embodiments, the position sensing assembly and the driving assembly at least partially overlap each other in a direction that is perpendicular to the main axis.

BRIEF DESCRIPTION OF DRAWINGS

Aspects of the present disclosure are best understood from the following detailed description when read with the accompanying figures. It should be noted that, in accordance

FIG. 5 is a top view of some elements of the optical element driving mechanism.

DETAILED DESCRIPTION OF DISCLOSURE

Figure 1:
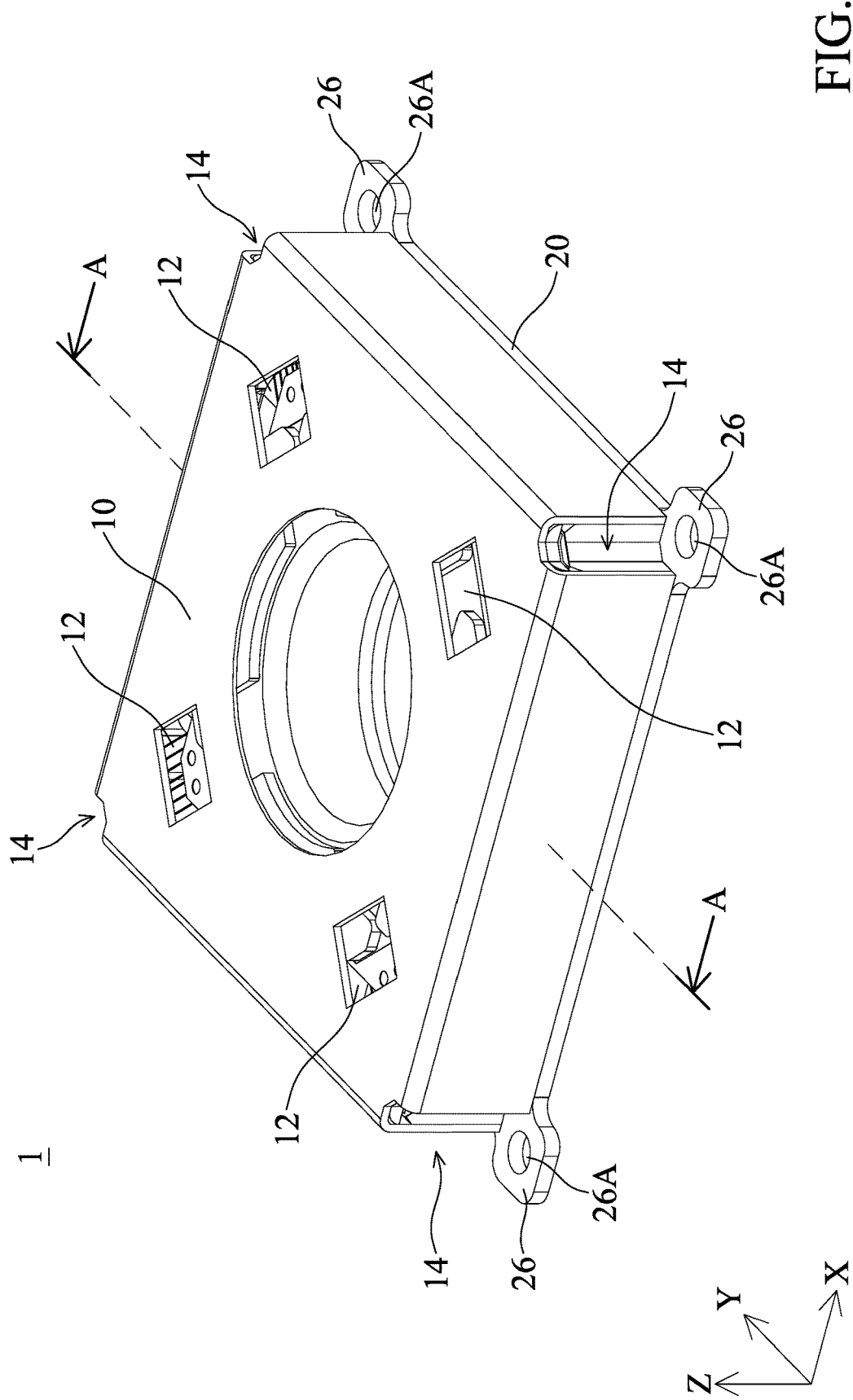
FIG. 1 is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
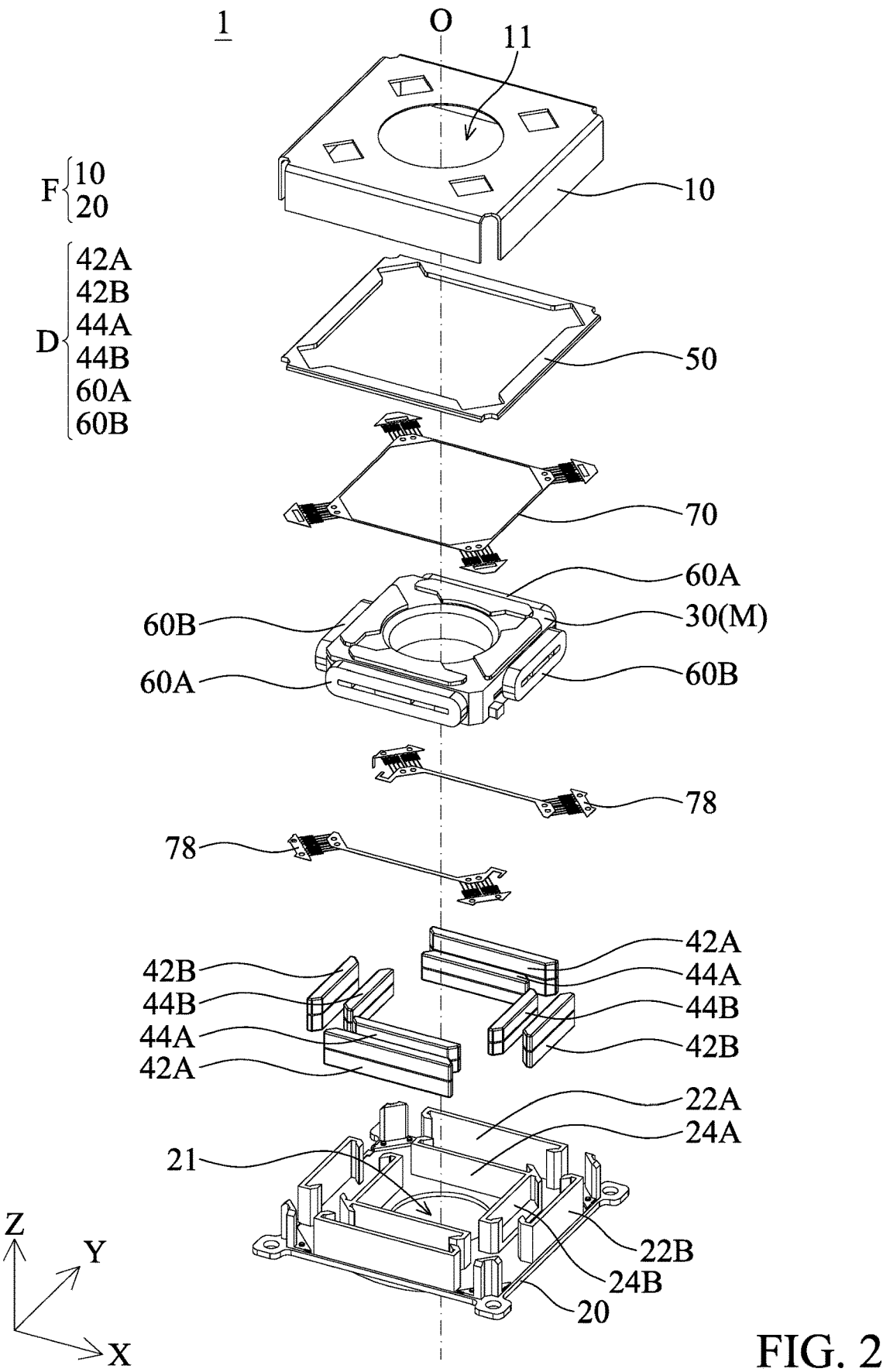
FIG. 2 is an exploded view of the optical element driving mechanism.
Figure 3:
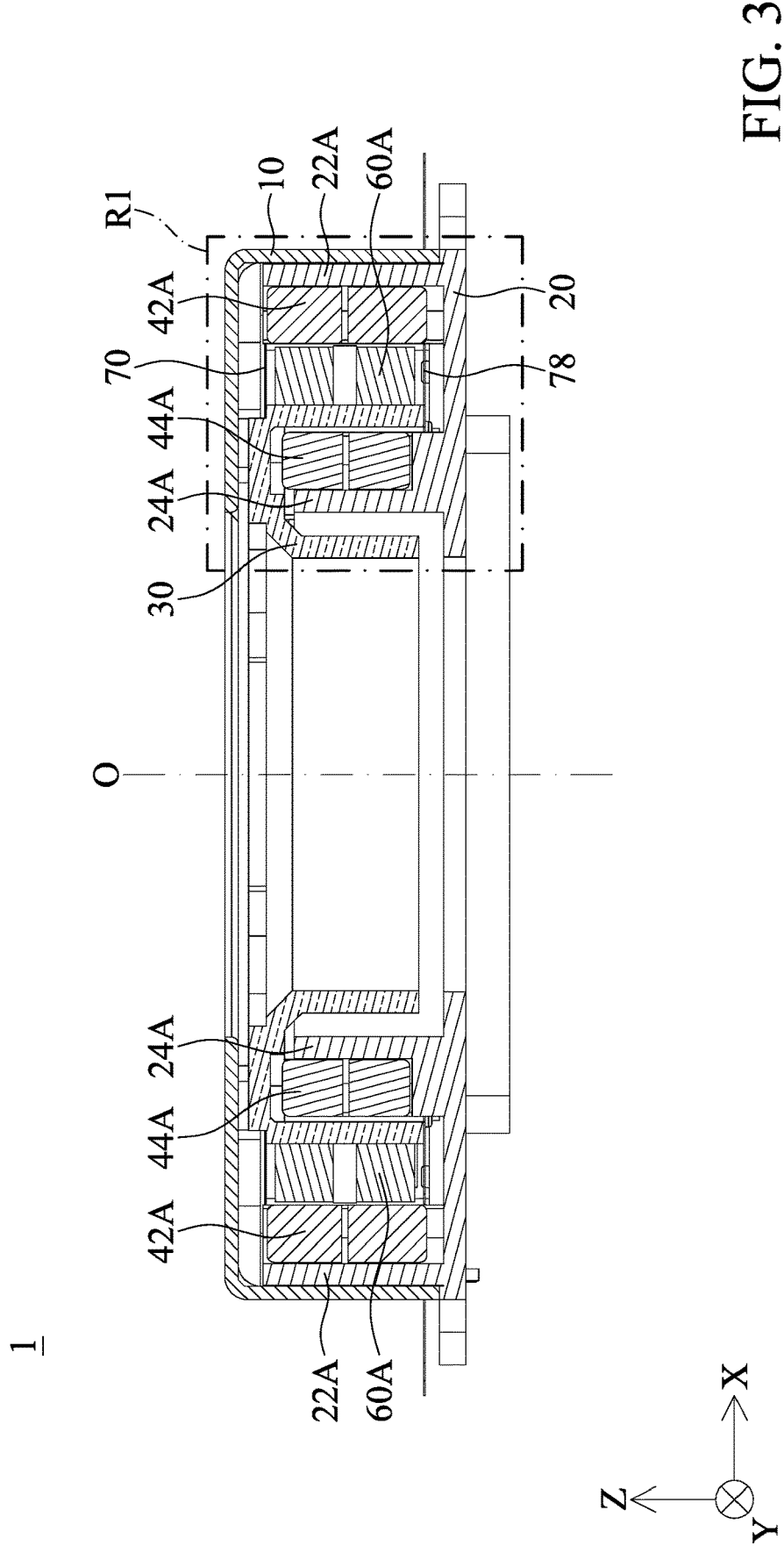
FIG. 3 is a cross-sectional view illustrated along line A-A in FIG. 1.
Figure 4:
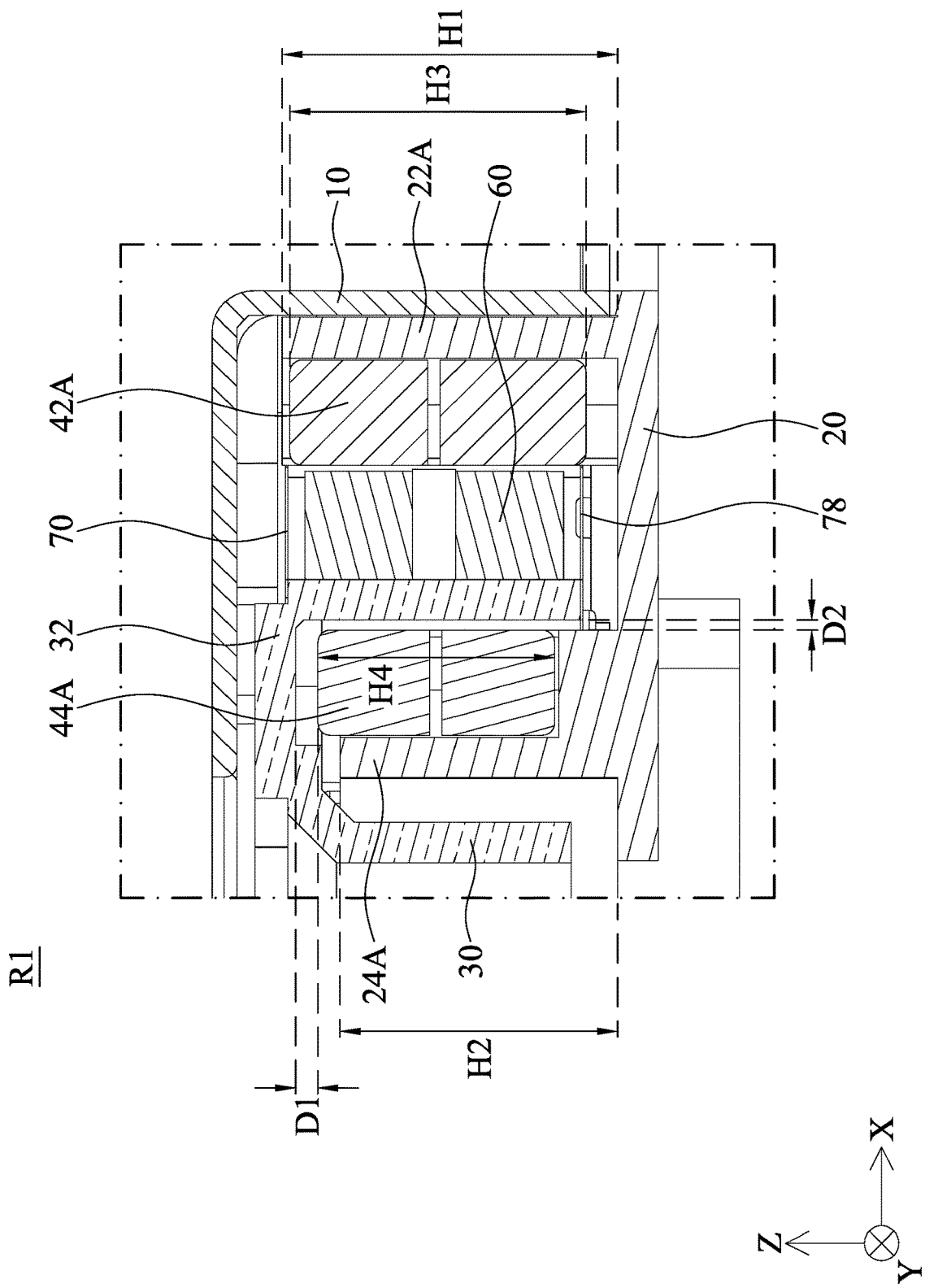
FIG. 4 is an enlarged view of the portion R1 in FIG. 3.

Refer to FIG. 1 to FIG. 4, wherein FIG. 1 is a schematic view of an optical element driving mechanism 1 in some embodiments of the present disclosure, FIG. 2 is an exploded view of the optical element driving mechanism 1, FIG. 3 is a cross-sectional view illustrated along line A-A in FIG. 1, and FIG. 4 is an enlarged view of the portion R1 in FIG. 3. As shown in FIG. 1 to FIG. 4, in this embodiment, the optical element driving mechanism 1 mainly includes a case 10, a base 20, a holder 30, a first magnetic element 42A, a second magnetic element 44A, a third magnetic element 60A, a fourth magnetic element 42B, a fifth magnetic element 44B, a sixth magnetic element 60B, a frame 50, a first resilient element 70, and a second resilient element 78. The optical element driving mechanism 1 may drive an optical element (not shown), so auto focus (AF) or optical image stabilization (OIS) may be achieved.

The case 10 and the base 20 may be referred to as a fixed portion F, and the holder 30 may be referred to as a movable portion M. The movable portion M is movably connected to the fixed portion F, which means the movable portion M may be moved relative to the fixed portion. Moreover, the first magnetic element 42A, the second magnetic element 44A, the third magnetic element 60A, the fourth magnetic element 42B, the fifth magnetic element 44B, and the sixth magnetic element 60B may be referred to as a driving assembly D for driving the movable portion M moving relative to the fixed portion F.

The case 10 and the base 20 may be combined as an outer case of the optical element driving mechanism 1. For example, the base 20 may be affixed on the case 10. It should be noted that a case opening 11 and a base opening 21 may be formed on the case 10 and the base 20, respectively. The center of the case opening 11 corresponds to a main axis O of the optical element (not shown), and the base opening 21 corresponds to an image sensor (not shown) disposed outside the optical element driving mechanism 1. As a result, the optical element disposed in the optical element driving mechanism 1i may effect focusing with the image sensor along the main axis. Furthermore, as shown in FIG. 1, a plurality of top openings 12 may be formed on the case 10, adhesive may be provided through the top openings 12 to other elements of the optical element driving mechanism 1 to affix these elements. For example, the first resilient element 70 may be affixed on the holder 30.

Moreover, a plurality of corner openings 14 may be formed at the corners of the case 10, a plurality of connecting portions 26 may be formed on the corners of the base 20. Connecting portion openings 26A may be formed on the connecting portions 26. The base 20 may be affixed on other external elements by securing, such as using screws passing through the connecting portion openings 26A. The corner openings 14 may allow the screws passing through the case 10 rather than blocked by the case 10. In some embodiments, additional sealing material (not shown) may be provided at the corner openings 14 to prevent external dust from entering the optical element driving mechanism 1.

The holder 30 has a through hole, the optical element may be secured in the through hole, and the third magnetic element 60A and the sixth magnetic element 60B may be disposed on external surfaces of the holder 30. It should be noted that the interaction between the first magnetic element 42A, the second magnetic element 44A, the third magnetic element 60A, the fourth magnetic element 42B, the fifth magnetic element 44B, and the sixth magnetic element 60B may generate a magnetic force to move the holder 30 relative to the fixed portion F, so auto focus (AF) or optical image stabilization (OIS) may be achieved.

In this embodiment, the holder 30 and the optical element disposed therein is movably disposed in the fixed portion F. More specifically, the holder 30 may be connected to the fixed portion F by the first resilient element 70 and the second resilient element 78 formed by metal (FIG. 3) When current passes through the third magnetic element 60A and the sixth magnetic element 60B, the third magnetic element 60A and the sixth magnetic element 60B may interact with the magnetic field of the first magnetic element 42A, the second magnetic element 44A, the fourth magnetic element 42B, and the fifth magnetic element 44B, to generate an electromagnetic force to move the holder 30 and the optical element relative to the fixed portion F, so auto focus (AF) or optical image stabilization (OIS) may be achieved. Moreover, the holder 30 may include non-magnetic permeable metal to increase its durability and prevent magnetic interference with other elements from occurring.

In some embodiments, the first magnetic element 42A, the second magnetic element 44A, the third magnetic element 60A, the fourth magnetic element 42B, the fifth magnetic element 44B, and the sixth magnetic element 60B may include a combination of driving coils and driving magnets. For example, the first magnetic element 42A, the second magnetic element 44A, the fourth magnetic element 42B, and the fifth magnetic element 44B may be driving magnets, and the third magnetic element 60A and the sixth magnetic element 60B may be driving coils. In another example, the first magnetic element 42A, the second magnetic element 44A, the fourth magnetic element 42B, and the fifth magnetic element 44B may be driving coils, and the third magnetic element 60A and the sixth magnetic element 60B may be driving magnets, and is not limited thereto. The first the first magnetic element 42A, the second magnetic element 44A, the fourth magnetic element 42B, and the fifth magnetic element 44B may be positioned on the fixed portion F, and the third magnetic element 60A and the sixth magnetic element 60B may be positioned on the movable portion M, respectively. In some embodiments, the positions of the fixed portion F and the movable portion M are interchangeable.

It should be noted that the interaction between the first magnetic element 42A, the second magnetic element 44A, the third magnetic element 60A, the fourth magnetic element 42B, the fifth magnetic element 44B, and the sixth magnetic element 60B may create a magnetic force to move the holder 30 relative to the fixed portion F, so auto focus (AF) or optical image stabilization (OIS) may be achieved. In some embodiments, the driving assembly D may include other driving elements, such as piezoelectric elements, shape memory alloys, etc.

The frame 50 may be disposed between the case 10 and the holder 30, and may be affixed on the case by, for example, glue. Furthermore, the first resilient element 70 and the frame 50 do not overlap each other along the main axis O. As a result, the holder 30 and the first resilient element 70 may be protected.

In some embodiments, additional circuit may be provided on the base for electrically connecting to other electronic elements disposed inside or outside the optical element driving mechanism 1 to achieve auto focus or optical image stabilization. The circuit on the base 20 may send electrical signal to the third magnetic element 60A or the sixth magnetic element 60B through the first resilient element 70 or the second resilient element 78 to control the movement of the holder 30 in X, Y, or Z axis. The circuit on the base 20 may be attached to the second resilient element 78 by soldering or laser welding, so the third magnetic element 60A and the sixth magnetic element 60B may be electrically connected to external circuit.

Furthermore, additional driving circuits may be embedded in the base 20 (not shown) to interact with the driving assembly D for moving the holder 30. For example, driving forces with different directions may be generated to perform auto focus or optical image stabilization.

Figure 6:
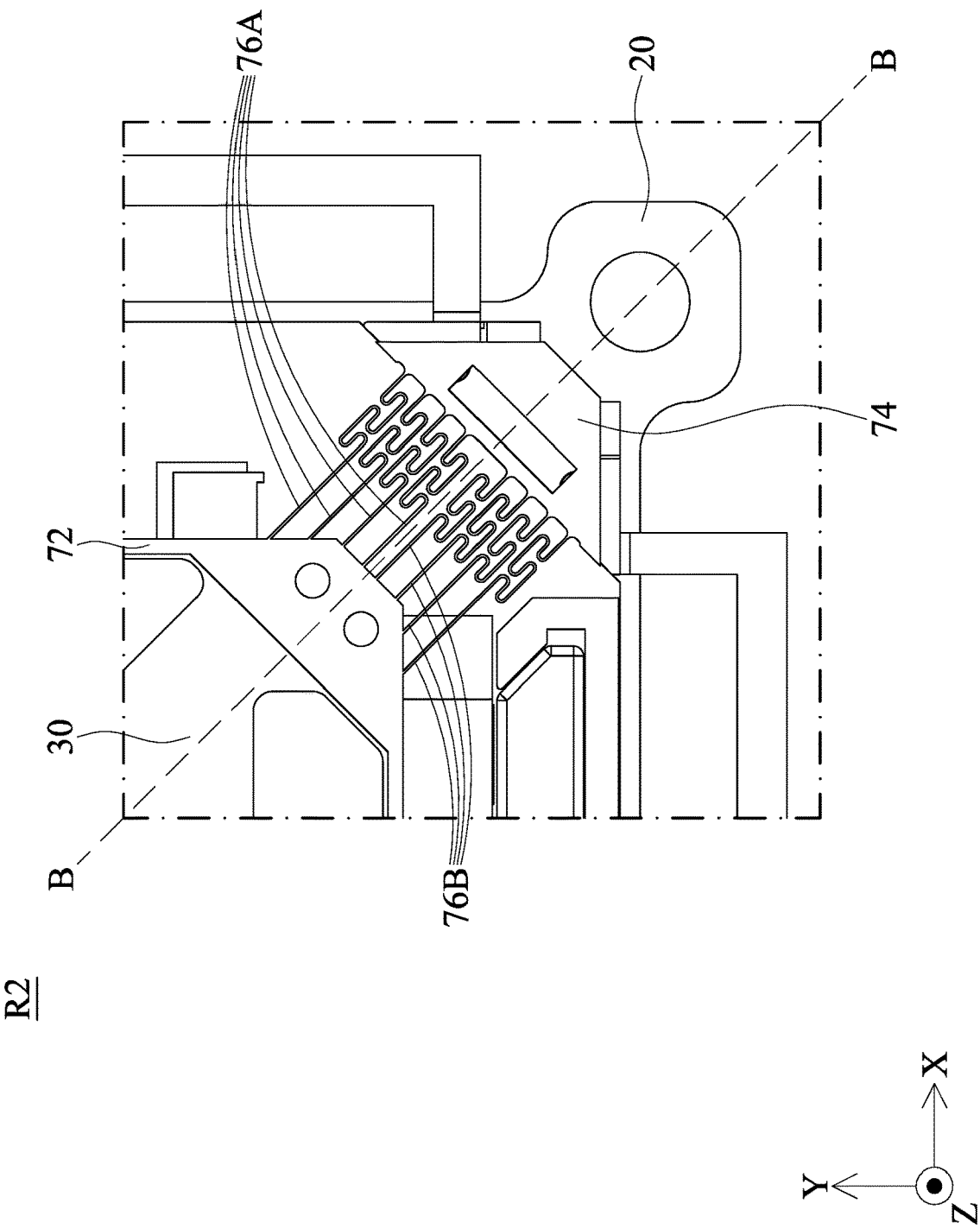
FIG. 6 is an enlarged view of the portion R2 in FIG. 5.

FIG. 5 is a top view of some elements of the optical element driving mechanism 1, and FIG. 6 is an enlarged view of the portion R2 in FIG. 5. As shown in FIG. 5 and FIG. 6, the first resilient element 70 may include an inner portion 72, an outer portion 74, and a plurality of first connecting portions 76A and a plurality of second connecting portions 76B. For example, the inner portion 72 may be disposed on the holder 30, and the outer portion 74 may be disposed on the base 20. In other words, the first resilient element 70 may connect the movable portion M and the fixed portion F to allow the movable portion M moving relative to the fixed portion F.

Multiple first connecting portions 76A and second connecting portions 76B in the first resilient element 70 allow the stress withstood by the first connecting portions 76A and second connecting portions 76B being dispensed, so the durability of the first connecting portions 76A and the second connecting portions 76B may be increased. Furthermore, the first connecting portions 76A and the second connecting portions 76B are symmetrical to line B-B in FIG. 6, so the stress in various directions may be balanced. The first connecting portions 76A and the second connecting portions 76B may be S-shaped to provide additional movable range of the holder 30.

Furthermore, as shown in FIG. 2, the optical element driving mechanism 1 further includes two second resilient element 78 (the resilient element) which may be used for connecting the movable portion M and the fixed portion F. The second resilient element 78 may have a similar structure to that of the first resilient element 70, such as multiple first connecting portions 76A and second connecting portions 76B. Moreover, the two second resilient elements 78 may be symmetrical to the main axis O to balance stresses in different directions. In some embodiments, the two second resilient elements 78 may be electrical insulating with each other, so different electrical signal may be provided to the two second resilient elements 78 to control the elements of the driving assembly separately.

The connecting portions of the first resilient element 70 and the second resilient element 78 (such as the first connecting portions 76A and the second connecting portion 76B) are positioned adjacent to the corners of the holder, the required length of the connecting portions may be reduced, so the required modulus of elasticity may be reduced.

Figure 7:
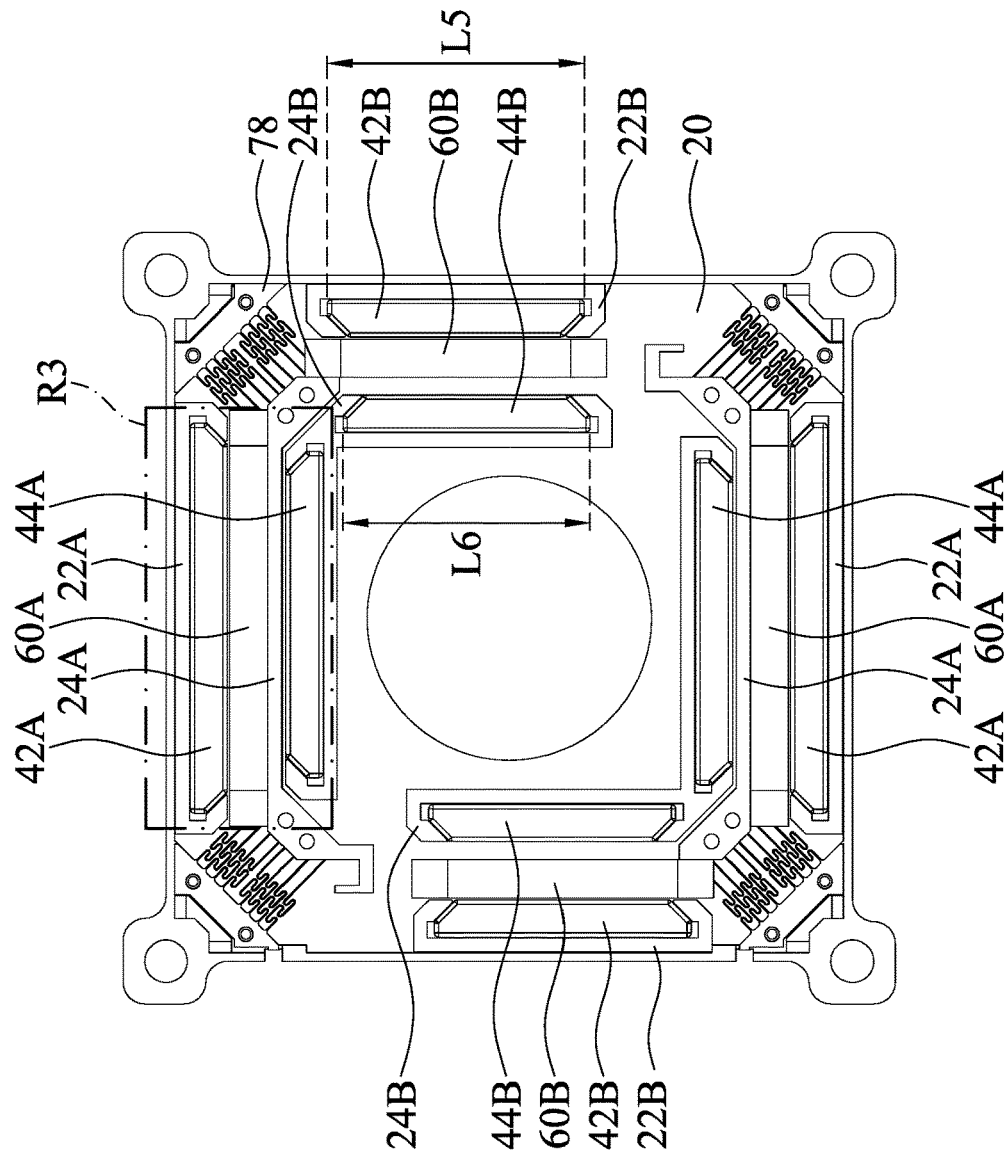
FIG. 7 is a top view of some elements of the optical element driving mechanism.
Figure 8:
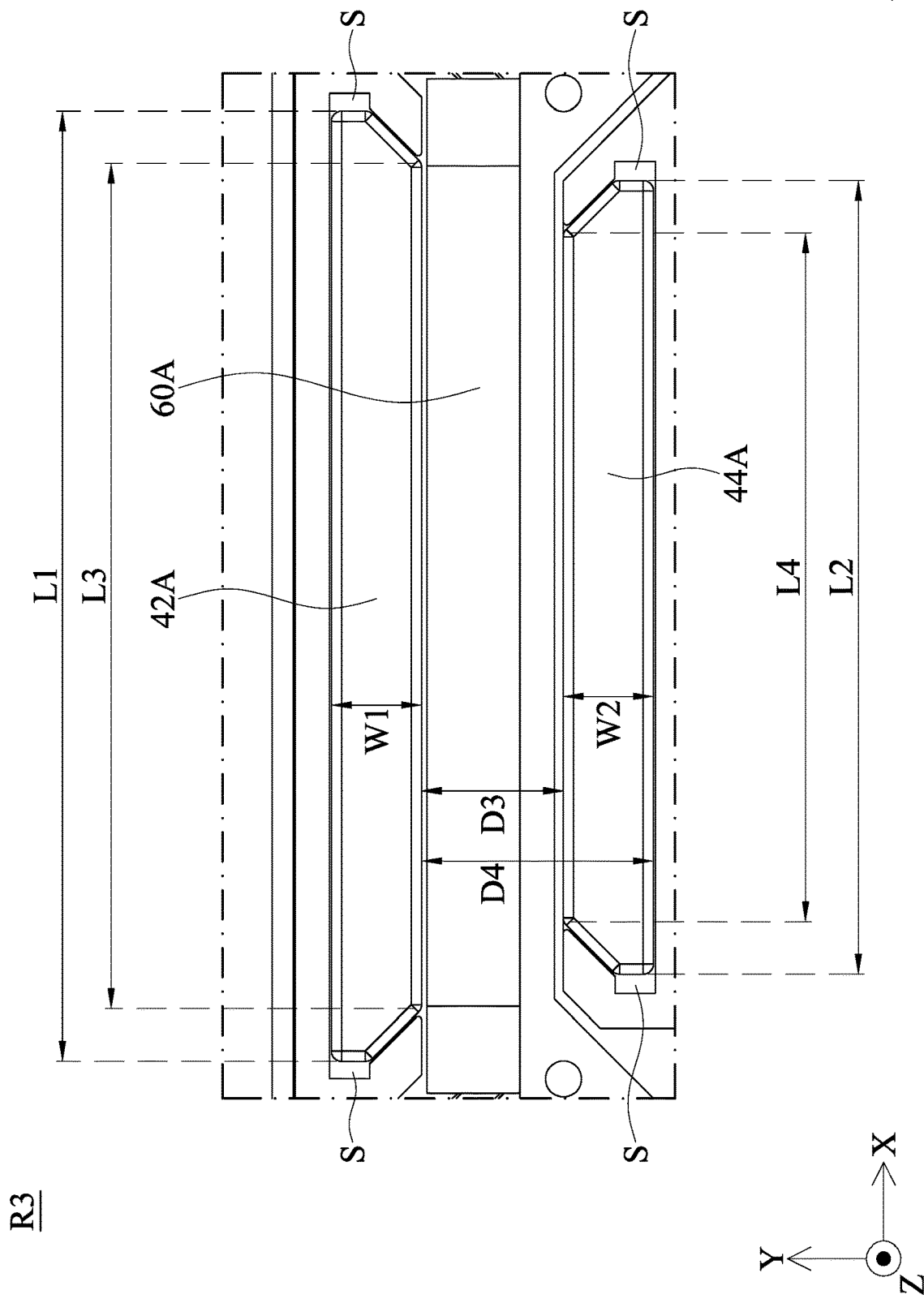
FIG. 8 is an enlarged view of the portion R3 in FIG. 7.

FIG. 7 is a top view of some elements of the optical element driving mechanism 1, and FIG. 8 is an enlarged view of the portion R3 in FIG. 7. As shown in FIG. 7, the third magnetic element 60A is disposed between the first magnetic element 42A and the second magnetic element 44A, and the sixth magnetic element 60B is disposed between the fourth magnetic element 42B and the fifth magnetic element 44B.

In some embodiments, the driving assembly D may include two first magnetic elements 42A, two second magnetic elements 44A, and two third magnetic elements 60A. The first magnetic elements 42A are symmetrical to the main axis O, the second magnetic elements 44A are symmetrical to the main axis O, and the third magnetic elements 60A are symmetrical to the main axis O.

As shown in FIG. 8, the first magnetic element 42A has a long side and a short side, the second magnetic element 44A has a long side and a short side, and the distance D3 between the short side of the first magnetic element 42A and the short side of the second magnetic element 44A is less than the distance D4 between the short side of the first magnetic element 42A and the long side of the second magnetic element 44A in a direction that is perpendicular to the main axis O.

As shown in FIG. 7 and FIG. 8, the length L1 of the first magnetic element 42A is different than the length L2 of the second magnetic element 44A in a first direction (X direction) that is perpendicular to the main axis O. Furthermore, the width W1 of the first magnetic element 42A is different than the width W2 of the second magnetic element 44A in a second direction (Y direction) that is perpendicular to the main axis, and the first is perpendicular to the second direction.

Moreover, the length L1 of the first magnetic element 42A may be different than the length L5 of the fourth magnetic element 42B, and the length L2 of the second magnetic element 44A may be different than the length L6 of the fifth magnetic element 44B to increase the flexibility of design. Furthermore, the lengths of the third magnetic element 60A and the sixth magnetic element 60B may also correspond to the first magnetic element 42A, the second magnetic element 44A, the fourth magnetic element 42B, and the fifth magnetic element 44B to be different. For example, if the length L1 of the first magnetic element 42A is greater than the length L5 of the fourth magnetic element 42B, the length of the third magnetic element 60A may also be greater than the length of the sixth magnetic element 60B, and vice versa.

In some embodiments, if the third magnetic element 60A and the sixth magnetic element 60B are driving coils, the third magnetic element 60A and the sixth magnetic element 60B may be electrically connected in series to reduce the design difficulty.

It should be noted that two driving magnets (e.g. the first magnetic element 42A and the second magnetic element 44A) are corresponding to one driving coil (e.g. the third magnetic element 60A) disposed between the two driving magnets, so the electromagnetic force generated by the driving assembly D may be increase to move a heavier optical element. Moreover, the first magnetic element 42A and the second magnetic element 44A may be designed as driving coils, and the third magnetic element 60A may be designed as a driving magnet, which also increases the generated electromagnetic force.

Figure 9:
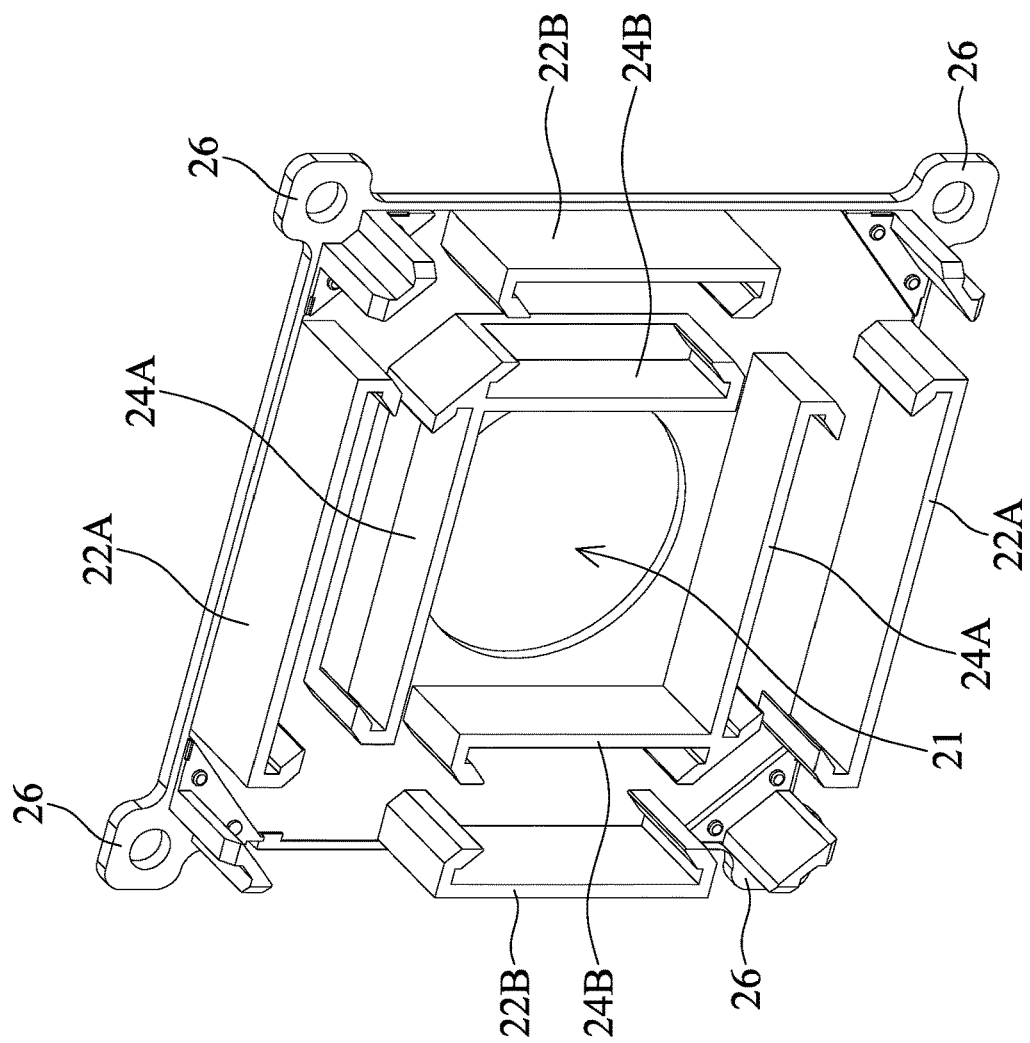
FIG. 9 is a schematic view of the base.

FIG. 9 is a schematic view of the base 20. The base 20 includes a first accommodating element 22A, a second accommodating element 24A, a third accommodating element 22B, and a fourth accommodating element 24B. The first magnetic element 42A, the second magnetic element 44A, the fourth magnetic element 42B, and the fifth magnetic element 44B may be disposed in the first accommodating element 22A, the second accommodating element 24A, the third accommodating element 22B, and the fourth accommodating element 24B, such as affixed therein by glue, respectively.

As shown in FIG. 7, FIG. 8, and FIG. 9, each of the first accommodating element 22A and the second accommodating element 24A has an opening, and the openings oriented to each other. Each of the third accommodating element 22B and the fourth accommodating element 24B also has an opening, and the openings also oriented to each other. As a result, the first magnetic element 42A, the second magnetic element 44A, the fourth magnetic element 42B, and the fifth magnetic element 44B disposed in the first accommodating element 22A, the second accommodating element 24A, the third accommodating element 22B, and the fourth accommodating element 24B may exposed from the openings to decrease the distances to the third magnetic element 60A and the sixth magnetic element 60B, so the electromagnetic force between these elements may be increased. In some embodiments, the second magnetic element 24A and the fourth magnetic element 24B may be connected to each other to reduce the amount of space required to achieve miniaturization.

Furthermore, the first magnetic element 42A, the second magnetic element 44A, the fourth magnetic element 42B, and the fifth magnetic element 44B may have trapezoid shape. For example, the long side of the first magnetic element 42A has a length L1, the short side of the first magnetic element 42A has a length L3, and the length L1 is greater than the length L3. The long side of the second magnetic element 44A has a length L2, the short side of the second magnetic element 44A has a length L4, and the length L2 is greater than the length L4. Furthermore, the short sides of the first magnetic element 42A and the second magnetic element 44A may be disposed at the openings of the first accommodating element 22A and the second accommodating element 24A, respectively. As a result, the first magnetic element 42A and the second magnetic element 44A may be prevented from being attracted out from the openings of the first accommodating element 22A and the second accommodating element 24A by the magnetic forces between the first magnetic element 42A and the second magnetic element 44A. Moreover, the first accommodating element 22A and the second accommodating element 24A may include magnetic permeable material, which also may prevent the first magnetic element 42A and the second magnetic element 44A from being attracted out from the openings of the first accommodating element 22A and the second accommodating element 24A by the magnetic forces between the first magnetic element 42A and the second magnetic element 44A.

In some embodiments, additional magnetic permeable elements (not shown) may be disposed at the side of the first magnetic element 42A that is away from the main axis O, or may be disposed at the side of the second magnetic element 44A that is adjacent to the main axis O, so the attracting force between the first magnetic element 42A and the second magnetic element 44A may be reduced to prevent the first magnetic element 42A and the second magnetic element 44A from being attracted out from the first accommodating element 22A and the second accommodating element 24A. Similar magnetic permeable elements may be provided on the fourth magnetic element 42B and the fifth magnetic element 44B, depending on design requirement.

In some embodiments, as shown in FIG. 8, in a direction of the length of the first magnetic element 42A and the second magnetic element 44A (X direction), a space S is formed between the first magnetic element 42A and the first accommodating element 22A, and is formed between the second magnetic element 44A and the second accommodating element 24A, and adhesive may be disposed in the space S to affix the first magnetic element 42A and the second magnetic element 44A.

Refer to FIG. 4, along the main axis O, the height H1 of the first accommodating element 22A and the height H2 of the second accommodating element 24A are different, and the height H3 of the first magnetic element 42A and the height H4 of the second magnetic element 44A are different. For example, the height H1 may be greater than the height H3, and the height H2 may be greater than the height H4. Furthermore, a distance D1 that is greater than zero may be formed between the top surface of the second magnetic element 44A and the holder 30 in Z direction, and a distance D2 that is greater than zero may be formed between the side surface of the second magnetic element 44A and the holder 30 in X direction. In other words, the second magnetic element 44A does not in direct contact with the holder 30, so the second magnetic element 44A may be prevented from being damaged by direct collide with the holder 30 when the holder 30 is moving relative to the fixed portion F.

Figure 10:
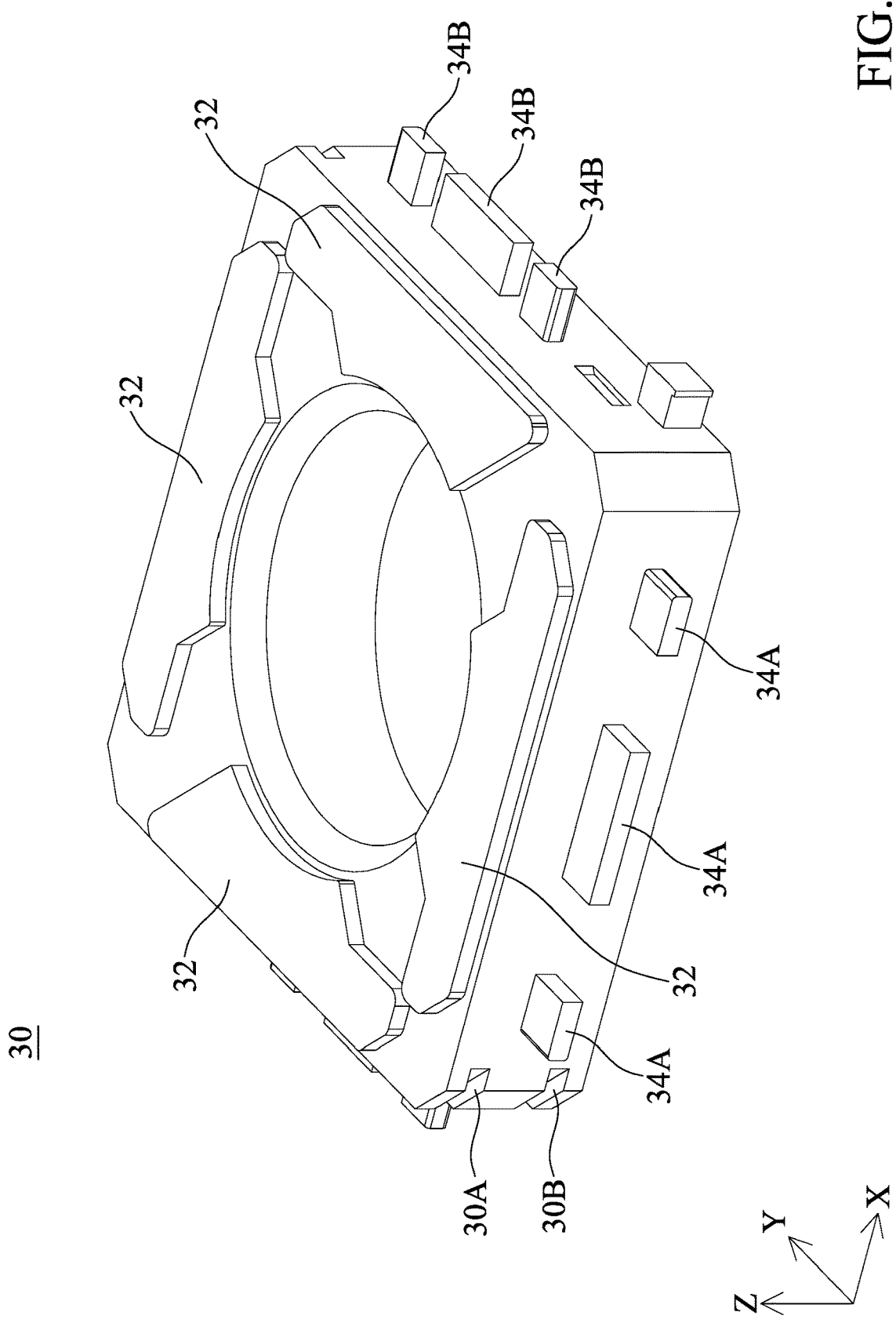
FIG. 10 is a schematic view of the holder.

FIG. 10 is a schematic view of the holder 30. The optical element driving mechanism may have a circuit (not shown) electrically connected to the driving assembly D, wherein the holder 30 has two recesses 30A and 30B, and the circuit may be disposed in the recesses 30A and 30B. Furthermore, the holder 30 has protruding portions 32 that are extending along the main axis O. As a result, when the holder 30 is moving relative to the fixed portion F along the main axis O, the protruding portions 32 may contact the case 10 to limit the movable range of the holder 30. In some embodiments, circuits that are electrically insulating with each other may be respectively disposed in the recess 30A and the recess 30B to prevent short circuit.

Moreover, a plurality of columns 34A and 34B may be formed on the holder 30. The third magnetic element 60A and the sixth magnetic element 60B may be disposed on the columns 34A and the columns 34B, respectively. As a result, the sizes of the third magnetic element 60A and the sixth magnetic element 60B may be increased to enhance the electromagnetic force of the driving assembly D. Furthermore, the columns 34A and 34B may limit the movable range of the holder 30 relative to the fixed portion F when the holder 30 moves on the XY plane.

Figure 11:
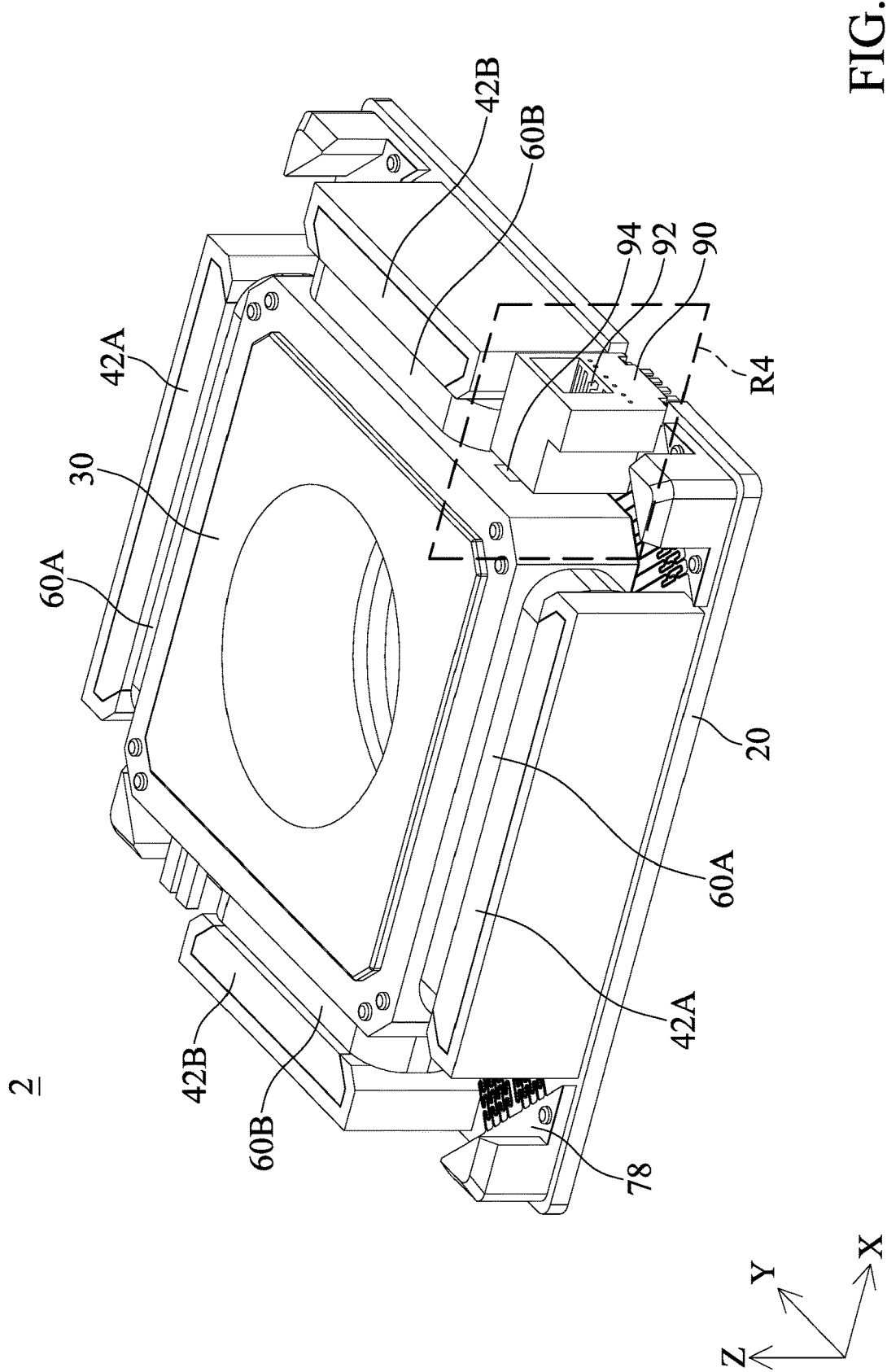
FIG. 11 is a schematic view of some elements of an optical element driving mechanism in some embodiments of the present disclosure.
Figure 12:
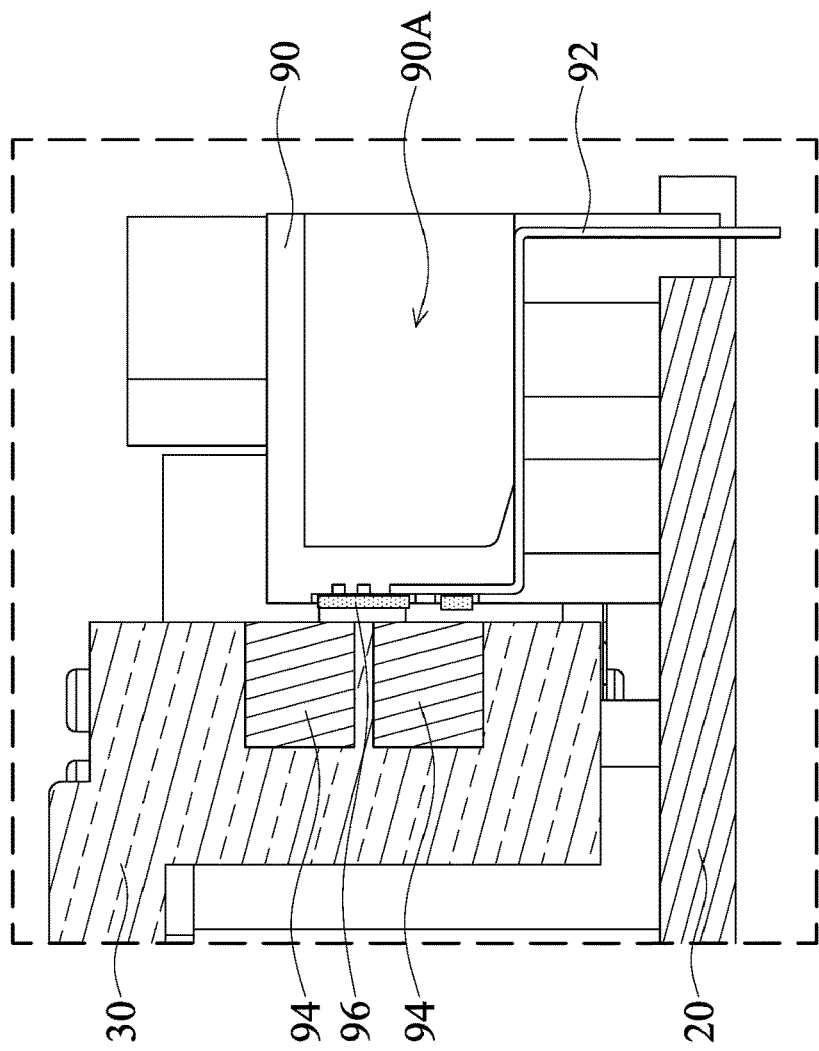
FIG. 12 is an enlarged cross-sectional view of the portion R4 in FIG. 11.

FIG. 11 is a schematic view of some elements of an optical element driving mechanism 2 in some embodiments of the present disclosure, and FIG. 12 is an enlarged cross-sectional view of the portion R4 in FIG. 11. It should be noted that some elements of the optical element driving mechanism 2 are not shown for clarity, such as the case, the first resilient element, etc.

The optical element driving mechanism 2 may further include a connecting element 90, a connecting circuit 92 and a position sensing assembly P (which includes a first position sensing element 94 and a second position sensing element 96). The position sensing assembly P may be disposed on the fixed portion F (such as the base 20) or the movable portion M (such as the holder 30). For example, in some embodiments, the first position sensing element 94 and the second position sensing element 96 may be disposed on the movable portion M and the fixed portion F, respectively. For example, the first position sensing element 94 may be embedded in the movable portion M (such as the holder 30), and the second position sensing element 96 may be disposed on the connecting element 90. Furthermore, in some embodiments, the first position sensing element 94 and the second position sensing element 96 may be disposed on the fixed portion F and the movable portion M, respectively, and the first position sensing element 94 may be disposed on the connecting element 90. In some embodiments, the connecting element 90 may be separate from the base 20.

The first position sensing element 94 and the second position sensing element 96 of the position sensing assembly P may be a position sensor and a magnet, respectively. When the holder 30 moves relative to the fixed portion F, the position sensor may detect the magnetic field variation of the magnet to get the position of the holder 30 relative to the fixed portion F.

The connecting element 90 may include a concave portion 90A, and the connecting circuit 92 is electrically connected to the position sensing assembly P (such as the first position sensing element 94 or the second position sensing element 96) and other external elements through the concave portion 90A, so the signal of the position sensing assembly P may be provided to other external elements. For example, as shown in FIG. 12, the connecting circuit 92 may be partially embedded in the connecting element 90. Furthermore, the position sensing assembly P and the driving assembly D (such as the fourth magnetic element 42B in FIG. 11) at least partially overlap each other in a direction that is perpendicular to the main axis O, such as the Y direction in FIG. 11, to reduce the amount of space required for miniaturization. In some embodiments, the connecting element 90 comprises plastic to prevent short circuit occurs between the connecting circuit 92 and the connecting element.

In some embodiments, the second position sensing element 96 may include a Hall effect sensor, a magnetoresistance effect sensor (MR Sensor), a giant magnetoresistance effect sensor (GMR sensor), a tunneling magnetoresistance effect sensor (TMR sensor), or a fluxgate sensor.

In summary, an optical element driving mechanism is provided. The optical element driving mechanism includes a movable portion, a fixed portion, and a driving assembly. The movable portion is used for connecting to an optical element, wherein the optical element has a main axis. The movable portion is movably connected to the fixed portion. The driving assembly is disposed on the movable portion or the fixed portion for driving the movable portion moving relative to the fixed portion. As a result, the driving force of the driving assembly may be increased to drive a heavier optical element.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a movable portion for connecting to an optical element, wherein the optical element has a main axis;
   a fixed portion comprising a base, wherein the movable portion is movably connected to the fixed portion; and
   a driving assembly disposed on the movable portion or the fixed portion for driving the movable portion moving relative to the fixed portion,
   wherein the driving assembly comprises:
   a first magnetic element disposed on the base;
   a second magnetic element disposed on the base; and
   a third magnetic element disposed on and fixed on the movable portion, and wherein the entire third magnetic element is completely disposed between the first magnetic element and the second magnetic element in a direction perpendicular to the main axis;
   wherein types the first magnetic element and the second magnetic element are one of coil or magnet, and a type of the third magnetic element is another one of coil or magnet, and the types of the first magnetic element and the second magnetic element are different from the type of the third magnetic element.

2. The optical element driving mechanism as claimed in claim 1, wherein the driving assembly further comprises:
   a fourth magnetic element;
   a fifth magnetic element; and
   a sixth magnetic element,
   the sixth magnetic element is disposed between the fourth magnetic element and the fifth magnetic element, a length of the first magnetic element is different than a length of the fourth magnetic element, and a length of the second magnetic element is different than a length of the fifth magnetic element.

3. The optical element driving mechanism as claimed in claim 2, wherein the first magnetic element comprises a long side and a short side, the second magnetic element comprises a long side and a short side, and a distance between the short side of the first magnetic element and the short side of the second magnetic element is less than a distance between the short side of the first magnetic element and the long side of the second magnetic element in a direction that is perpendicular to the main axis.

4. The optical element driving mechanism as claimed in claim 1, wherein the first magnetic element has a tropical shape, and the second magnetic element has a trapezoid shape.

5. The optical element driving mechanism as claimed in claim 1, wherein the base comprises a first accommodating element and a second accommodating element, the first magnetic element is disposed in the first accommodating element, and the second magnetic element is disposed in the second accommodating element, wherein the first accommodating element has a first opening, the second accommodating element has a second opening, and the first opening and the second opening open in opposite directions.

6. The optical element driving mechanism as claimed in claim 5, wherein a height of the first accommodating element is different than a height of the second accommodating element along the main axis.

7. The optical element driving mechanism as claimed in claim 1, wherein a height of the first magnetic element is different than a height of the second magnetic element along the main axis.

8. The optical element driving mechanism as claimed in claim 1, wherein a length of the first magnetic element is different than a length of the second magnetic element in a first direction that is perpendicular to the main axis.

9. The optical element driving mechanism as claimed in claim 8, wherein a width of the first magnetic element is different than a width of the second magnetic element in a second direction that is perpendicular to the main axis, and the first direction is perpendicular to the second direction.

10. The optical element driving mechanism as claimed in claim 1, wherein the driving assembly comprises two first magnetic elements, two second magnetic elements, and two third magnetic elements, the first magnetic elements are symmetrical to the main axis, the second magnetic elements are symmetrical to the main axis, and the third magnetic elements are symmetrical to the main axis.

11. The optical element driving mechanism as claimed in claim 1, further comprising two resilient elements connected to the movable portion and the fixed portion.

12. The optical element driving mechanism as claimed in claim 11, wherein the resilient elements are symmetrical to the main axis.

13. The optical element driving mechanism as claimed in claim 1, further comprising a circuit electrically connected to the driving assembly, wherein the movable portion includes two recesses, and the circuit is positioned in the two recesses.

14. The optical element driving mechanism as claimed in claim 1, wherein the movable portion comprises a holder, and a protruding portion is formed on the holder and extending in the main axis.

15. The optical element driving mechanism as claimed in claim 14, wherein a column is formed on the holder and extending in a direction perpendicular to the main axis, and the third magnetic element surrounds the column.

16. The optical element driving mechanism as claimed in claim 1, further comprising a position sensor assembly disposed on the fixed portion or the movable portion.

17. The optical element driving mechanism as claimed in claim 16, wherein the position sensing assembly comprises a first position sensing element disposed on the movable portion and a second position sensing element disposed on the fixed portion, and the first position sensing element is embedded in the movable portion.

18. The optical element driving mechanism as claimed in claim 16, further comprising a connecting element, wherein the position sensing assembly comprises a first position sensing element disposed on the connecting element and a second position sensing element disposed on the movable portion.

* * * * *